Nov. 6, 1945.  R. C. GUNNESS  2,388,536
CATALYTIC REFORMING
Filed July 26, 1940
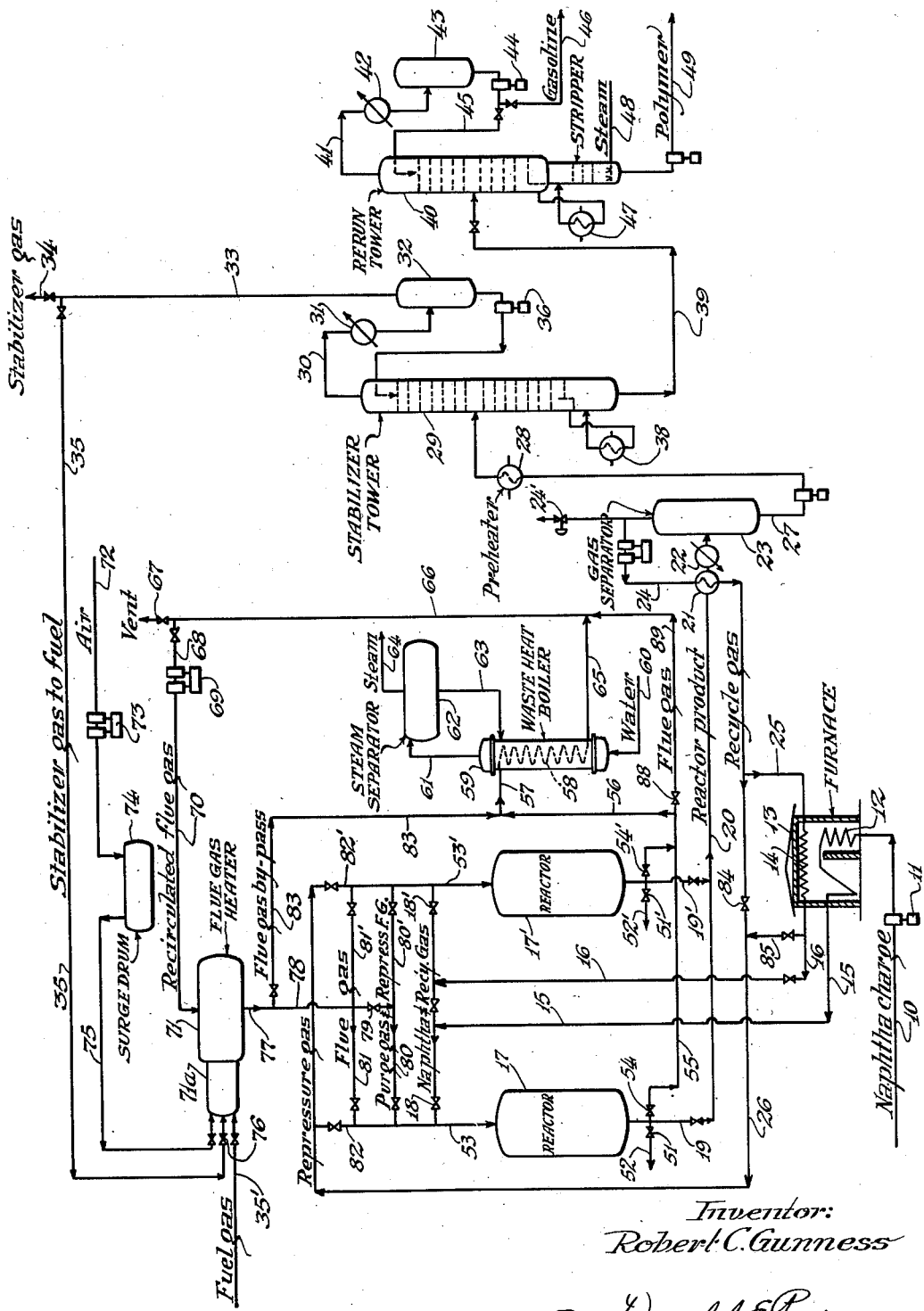
Inventor:
Robert C. Gunness
By Donald E. Payne
Attorney Patented Nov. 6, 1945

2,388,536

UNITED STATES PATENT OFFICE 2,388,536

CATALYTIC REFORMING

Robert C. Gunness, Chicago, Ill., assignor to Standard Oil Company, Chicago, Ill., a corporation of Indiana Application July 26, 1940, Serial No. 347,810

5 Claims. (Cl. 196—50)

This invention pertains to catalytic conversion processes such as reforming, aromatization, dehydrogenation, hydrogenation, isomerization, alkylation, desulfurization, polymerization, cracking, etc., and it relates more particularly to a catalytic reforming process and to improved methods for the purging or stripping and regeneration of catalysts which are employed in hydrocarbon conversion processes operating at superatmospheric pressure.

In hydrocarbon conversion processes employing solid catalysts the activity of said catalysts gradually falls off due to deposits of carbonaceous materials and it is therefore necessary from time to time to interrupt the flow of hydrocarbons through the catalyst material and to regenerate the catalyst by burning the carbonaceous deposits therefrom. In this burning step the temperature must be carefully controlled to prevent sintering of the catalyst or loss of catalyst activity. Valuable hydrocarbons should be removed and preferably recovered from the spent catalyst before the burning or oxidation step and the oxidizing gases should be entirely removed from the catalyst zone before it again goes on-stream. An object of my invention is to provide a practical and commercial method and means for effecting this regeneration and these purging steps.

A further object is to provide method and means for regenerating large volumes of catalyst in situ without the necessity of employing complicated and expensive heat exchangers in the catalyst bed. The so-called Houdry catalyst chamber, for instance, requires a mass of tubes imbedded in the catalyst for absorbing heat of regeneration and assisting in temperature regulation. My object is to avoid the complicated, expensive and troublesome conduits, heat exchange coils, etc. which have heretofore been imbedded in the mass of catalyst material, to simply support a massive bed catalyst in a reaction chamber which contains practically nothing but catalyst material and to obtain with this simplified apparatus an even closer temperature control and more efficient regeneration than can be obtained with the complicated structures heretofore used.

A further object of the invention is to provide improved methods and means for purging the catalyst bed both before and after regeneration. A further object is to provide improved methods and means for coordinating the catalyst purging with regeneration and actual use, respectively. A further object is to strip oil out of spent catalyst before regeneration without impairing the physical or chemical structure of the catalyst. A further object is to simultaneously strip regeneration gases from catalyst material and condition said catalyst for reuse.

A further object of the invention is to provide a regeneration system wherein flue gas may be recirculated at a substantially constant rate regardless of the ever-changing requirements of each catalyst bed as it consecutively is on-stream, purged, regenerated and purged. A further object is to provide an improved method and means for utilizing the heat of by-passed flue gas as well as regeneration gas.

A further object is to employ improved method and means for simultaneously regulating the temperature and oxygen concentration of gases employed for regeneration and purging. A further object is to provide an improved method and means for introducing oxygen into regeneration gases along with recycled gases.

The problem of catalyst regeneration is one of long standing and is perhaps the most serious problem which confronts a refinery adopting a catalytic conversion process. All simple solutions heretofore proposed have been inoperative for commercial use and the enormous expense of the more complicated regeneration processes has been one of the chief deterrents with regard to commercial adoption of catalytic conversion processes. The primary object of my invention is to provide a simple and inexpensive system for purging and regenerating spent catalyst material which will be even more efficient than systems heretofore employed, and which will at the same time maintain high catalyst activity and prolong catalyst life. A further object is to provide a regeneration system wherein utility and operating costs as well as investment costs are reduced to a minimum. Other objects will be apparent as the detailed description of the invention proceeds.

While many features of the invention are applicable to a wide variety of catalytic conversion processes, the invention is particularly useful in processes of catalytic reforming or aromatization wherein hydrocarbon vapors are contacted with catalysts in the presence of hydrogen at a pressure of 200 to 400 pounds per square inch. The preferred catalyst of such a process is a group VI oxide such as molybdenum oxide mounted on alumina. This catalyst may be on-stream for about six hours and it is therefore desirable that the complete purging and regeneration be effected in a like time in order that one catalyst chamber may be fully prepared for again going on-stream before the catalyst in the other chamber becomes deactivated.

The invention contemplates a commercial process as will be hereinafter described in detail. Among the outstanding features of the invention is the variation of flue gas composition at the various stages of purging and regeneration. Prior to the purging steps the flue gas is modified to insure absence of oxygen and to have a carbon monoxide or hydrogen content sufficient to make it a reducing gas instead of an oxidizing gas. After a spent catalyst has been stripped and brought to a pressure of about 100 to 120 pounds per square inch, the oxygen content of the flue gas is regulated to effect combustion of carbonaceous materials without exceeding a temperature of about 1150° F. The flue gases with added oxygen may be introduced into the catalyst chamber at temperatures as low as 525° F., the heat in the body of the catalyst bed being sufficient to raise their temperature to the kindling point and to support combustion. The introduced flue gases will usually be at about 525 to 850° F.

The air which is added to the flue gases is preferably introduced into the combustion zone of the flue gas generator rather than to the mixing zone thereof, and may be introduced either as primary or secondary air through the same lines etc. that are used in the combustion zone itself.

The pressure of regeneration may range from 50 to 150 pounds or higher, but I have found pressures above 100 and preferably of about 120 pounds per square inch to be particularly advantageous.

One feature of the invention that may or may not be used is the use of a recycle gas containing hydrogen at temperatures of 950 to 1100° F. or higher for purging catalyst material and conditioning the catalyst. When this step is used in the initial purge step, the purged products are recovered directly with the other products. When it is used after regeneration it shortens the reheating step and conditions the catalyst for the on-stream reaction.

The use of separate recycle gas and oil transfer lines is important in that it minimizes thermal conversion and increases the efficiency of the process. Much of the heat for the conversion is supplied by superheating the recycle gas.

The invention will be more clearly understood from the following detailed description read in connection with the accompanying drawing which forms a part of this specification and which schematically illustrates a flow diagram of my improved catalytic reforming and regeneration system.

While the invention is applicable to a wide variety of catalytic conversion processes it will be described in connection with a catalytic reforming process for converting low octane number virgin naphtha into high octane number motor fuel. In my specific example I will describe a commercial unit of 7500 barrels per day charging capacity.

The catalyst employed in this process is preferably molybdenum oxide supported on alumina. It should be clearly understood, however, that the invention is applicable to the wide variety of catalytic processes hereinabove enumerated. For catalytic cracking the charging stock may be gas oils or heavier products and the catalyst may be activated natural clays such as acid-treated bentonite (Super Filtrol), metal oxides admixed with or deposited on activated silica, silica gel, etc.; oxides of metals such as aluminum, magnesium, copper, nickel, cerium, thorium, manganese, etc. may be co-precipitated with silica gel, ball-milled therewith or deposited thereon by impregnation or adsorption and the catalyst may be in any suitable granular or pelleted form. For dehydrogenation, reforming, aromatization, etc. I prefer to employ alumina as the catalyst support and to mount thereon oxides of metals of the left-hand column of group VI of the periodic system, particularly chromium and molybdenum, and/or oxides of certain other metals such as thorium, cerium, vanadium, etc. For polymerization the catalyst may comprise phosphoric acid on kieselguhr or copper pyro-phosphate, etc. on any suitable support. No novelty per se is claimed in any particular catalyst and the catalysts require no further description. Those skilled in the art are familiar with the temperatures at which various catalysts should be regenerated and the following description of a preferred embodiment of the invention will be sufficient to teach those skilled in the art how to employ the invention in connection with other processes and other catalyst.

I will describe the treatment in my catalytic reforming unit of a 46 octane number CFR—M paraffinic type virgin heavy naphtha.

A typical inspection of this naphtha and of the product produced therefrom is as follows:

|  | Feed stock | Gasoline product |
|---|---|---|
| API gravity | 52.0 | 49.0 |
| Molecular weight | 127 | 111 |
| Reid vapor pressure | 0.5 | 7.0 |
| 50% distillation point °F. | 300 | 253 |
| End point °F. | 438 | 400 |
| Octane number CFR—M | 46.4 | 80 |
| Yield, weight percent |  | 84 |

The charging stock is introduced through line 10 by pump 11 into coils 12 of furnace 13 at a pressure such that the transfer line pressure is about 200 to 350 pounds, preferably about 315 pounds per square inch, and is heated therein to a temperature of about 950 to 1100° F., preferably about 1000° F. Recycle gas containing hydrogen is separately heated in coil 14 to a temperature which is preferably about 100 to 200 degrees F. higher than the temperature to which the charging stock is heated and under substantially the same pressure. The heated charging stock vapors and recycle gas are then passed by transfer lines 15 and 16, respectively, to one of the reactors 17 or 17'; assuming valve 18 is open and valve 18' is closed, the heated products will be introduced into reactor 17. Lines 15 and 16 join at a point near the reactors 17 and 17' prior to valves 18 and 18'.

The recycle gas may contain about 35% to 75% of hydrogen and it may also contain methane and other gaseous hydrocarbons. About 2 to 4.5, preferably about 3 mols of recycle gas are employed per mol of charging stock. In other words, about 1500 to 3500, preferably 2500, cubic feet of recycle gas (at standard temperature and pressure) are employed per barrel of charging stock. On a hydrogen basis this means that I employ about 1 to 3 or preferably 1½ mols of hydrogen per mol of charging stock or 800 to 2500, preferably about 1200 cubic feet of hydrogen per barrel of charging stock.

The reaction chamber 17 is preferably a cylindrical pressure vessel with one or more supporting trays and it may be about 14 or 15 feet in diameter and 16 feet high. It contains about 45 tons of catalyst material. Any excess space in this chamber should be left at the bottom of the chamber so that there will be no open space at the point of charging stock inlet which might give rise to thermal cracking or reforming with consequent coke deposits.

The pressure in the top of the reactor is preferably about 315 pounds per square inch gauge but it may vary from about 200 to 350 pounds per square inch, and the pressure drop through the catalyst bed may be of the order of 1 or 2 pounds per square inch. The average temperature of the catalyst is preferably about 950° to 975° F. (as will be hereinafter described). The entering gases and vapors are at a temperature of about 950° to 1100° F., preferably 1050° F., the gases and vapors leaving the chamber are preferably at about 850° to 1025° F., preferably about 900° F., and the average temperature during on-stream treatment is about 900° to 1000° F., preferably about 975° F. The rate of flow is about 0.5 to 2.0, preferably about 1 volume (liquid basis) of oil per volume of catalyst space per hour. The estimated linear velocity will be about 0.2 to 0.75 or preferably about 0.4 feet per second.

During the on-stream period, which is preferably about 6 hours, but which may vary within considerable limits, the gases and products from the reactor are withdrawn through lines 19 and 20 through heat exchanger 21 and cooler 22 to recycle gas separator 23 which is operated at a temperature of about 100° F. and a pressure of about 275 pounds gauge. It should be understood that the hot reaction products may likewise be used in other heat exchangers for supplying heat necessary for fractionation, for heating charging stock, etc.

The recycle gas which may contain about 50% hydrogen is withdrawn by a compressor through line 24, passed through heat exchanger 21 and either introduced through line 25 to coil 14 or through line 26 for use as a stripping and pressuring gas as will be hereinafter described. A portion of the gas may be vented through pressure controlled valve 24' which is set to open at a pressure of about 275 to 310 pounds per square inch for venting excess gases from the system.

The liquid products from the base of separator 23 are withdrawn through line 27 by a pump and introduced through preheater 28 into stabilizer tower 29 which preferably operates with a top temperature of about 145° F., a bottom temperature of 480° F., and a pressure of about 335 pounds gauge. Overhead gases are withdrawn through line 30, partially condensed in cooler 31 and introduced into separator 32, the uncondensed gases being withdrawn through line 33 and either vented through line 34 to a suitable fuel gas line or passed by line 35 for use in the regeneration system which will be hereinafter described. Condensed hydrocarbons from separator 32 are returned by pump 36 to tower 29 to serve as reflux. Heat for the base of the stabilizer tower may be supplied by reboiler 38 or by any other suitable means.

The stabilized product from the base of tower 29 is introduced by line 39 into re-run tower 40 which preferably operates with a top temperature of 300° F. and a bottom temperature of 450° F. under a pressure of about 5 pounds gauge. The overhead from this tower is withdrawn through line 41 through condenser 42 to accumulator tank 43 from which a part of the liquid may be introduced by pump 44 and line 45 to the top of re-run tower 40 as reflux and the remainder of the product may be withdrawn through line 46 to gasoline storage.

Heat for the base of re-run tower is supplied by reboiler 47 or any other suitable means and the polymers or heavy ends which leave the base of the tower are preferably stripped with steam, introduced through line 48, suitable means being provided for the separation of introduced steam if open stem stripping is employed. The polymers or heavy ends are withdrawn through line 49.

After reactor 17 has been on-stream for about 6 hours the catalyst activity is sufficiently decreased because of carbonaceous deposits that it is desirable to regenerate. The hot charge stocks are then transferred to reactor 17' and valve 18 and the valve in line 19 are closed. Valve 51 is then slowly opened in order that reaction chamber 17 may be slowly depressured, i. e. reduced to atmospheric pressure. Any sudden release in pressure has been found to be deleterious to the catalyst structure and a time of about 4 to 6 minutes is preferably allowed for this depressuring step. The gases and vapors withdrawn through line 52 during this depressuring step and during the following purging step are preferably charged to a suitable recovery system (not shown) for condensing, separating, and recovering the valuable hydrocarbons which are removed from the catalyst.

After reaction chamber 17 has been reduced to substantially atmospheric pressure hot flue gas (which contains no oxygen) is introduced thereinto through line 53. This flue gas is preferably at a temperature of about 650 to 850° F. and it effectively removes the last traces of volatile hydrocarbons from the catalyst material. The purging with flue gas may require about 2 to 4 minutes. After this purging step valve 51 is closed and hot flue gases are introduced into reactor chamber 17 until the pressure therein reaches about 100 pounds gauge. This repressuring only requires a few minutes, the total time for purging and repressuring being about 8 to 12 minutes.

When the reactor has been brought to regeneration pressure valve 54 is opened and a mixture of oxygen with hot flue gas is introduced into the reactor through line 53 in order to effect combustion of the carbonaceous deposits on the catalyst. The regeneration temperature is controlled during the entire regeneration period by regulating the amount of oxygen which is introduced with the flue gas, so that at no place in the reactor does the temperature exceed about 1150° F. During most of the regeneration period the regeneration gases enter the reactor at about 650° F. and the hot regeneration gases leave the reactor at a temperature slightly less than 1150° F. The introduction of regeneration gases into the reactor at about 650° F. has been found to give unexpectedly advantageous results. With lower inlet temperatures such as 600° F. a considerable amount of secondary burning takes place after the primary burn-out. At inlet temperatures of about 700° F. there is practically no secondary burning but regeneration time is unduly long. At inlet temperatures of 650° F. very little or no secondary burning occurs and the overall regeneration time is shorter than with either inlet temperatures of 600 or inlet temperatures of 700° F.

The hot gases which leave the reactor are withdrawn through lines 55, 56 and 57 to coils 58 in waste heat boiler 59. Water is introduced into this boiler through line 60 and steam is withdrawn through line 61 to steam separator 62, the separated water being returned to the boiler through line 63 and steam being withdrawn through line 64 for supplying heat in various parts of the refinery.

The gases leaving coils 58 may be at a temperature of about 650° to 700° F. and at this temperature are withdrawn through lines 65 and 66, a part of the gases being vented through line 67 to the atmosphere and the remainder of the gases being passed by line 68, blower 69 and line 70 to flue gas heater 71. The flue gas blower operates at substantially constant load and boosts the pressure of these gases from about 93 or 95 pounds gauge to about 100 pounds gauge. It compresses about 125,000 pounds of flue gas per hour.

Flue gas heater 71 not only serves to reheat recirculated flue gas but it also serves as a flue gas generator and as a mixing chamber for air and flue gas. Air from line 72 is compressed in compressor 73 to about 100 pounds per square inch and discharged into surge drum 74 from which it may be withdrawn as required through valved line 75 to the combustion zone 71a of flue gas heater 71. By providing primary and secondary air inlets to the flue gas heater, more efficient combustion can be obtained and the necessary excess air required for regeneration will not interfere with the flame in the flue gas heater. Stabilizer gas from 35 may also be introduced into said combustion zone in amounts regulated by valve 76. Fuel gas from external sources may be introduced through line 35'. The combustion of stabilizer or fuel gas with air in the combustion zone of flue gas heater 71 thus supplies additional flue gas and serves as a means for regulating the temperature of recycled flue gas. My system requires about 15,000 pounds of air per hour (3,500 cubic feet per minute at atmospheric pressure and 100° F.) which is roughly about one-tenth of the amount of recycled gases. Flue gas from heater 71 is passed by lines 77 and 78 through regulating valve 79 to lines 80 and 80' which are preferably 4 inch lines provided with block valves discharging into line 53. The flue gas is introduced through lines 80 or 80' to the reactor chambers during the purging and repressuring steps. During the main regeneration period flue gases are charged to the reactor from line 78 through one of the 12 inch lines 81 or 81' which likewise are provided with a block valve and which discharge into lines 53 or 53'. Lines 82 and 82', which are provided with regulating valves, connect recycle gas line 26 with line 53 for supplying the repressuring gas.

During those periods when the full flue gas stream is not flowing through one of the reactors, the flue gas is by-passed from line 77 through line 83 to line 57, coils 58 and waste heat boiler 59.

To review once more the regeneration cycle for reactor 17:

(a) *Depressuring.*—While hot flue gases are by-passed through line 83 to the waste heat boiler and valves 18 and 54 and the valves in lines 19, 80, 81 and 82 are closed, regulating valve 51 is slowly opened to permit a gradual pressure drop in reactor 17. This operation must be carried out slowly in order to avoid crushing or otherwise impairing the catalyst and it may require about 5 minutes.

(b) *Purging and repressuring with flue gas.*—When atmospheric pressure has been reached the valve in line 80 is opened and the regulating valve 79 is opened to permit hot flue gas to flow through the reactor at substantially atmospheric pressure for stripping oil from the spent catalyst. Prior to this operation the fuel gas-air ratio at flue gas heater 71 has been so adjusted as to yield flue gas containing no oxygen and sufficient carbon monoxide to produce a reducing atmosphere. After about 2 or 4 minutes of stripping, valve 51 is closed and the pressure in the reactor is permitted to reach about 100 pounds gauge. The total time required for purging and repressuring is about 8 minutes. Throughout this period the flue gas contains no oxygen and the excess flue gas is recycled through line 83 to waste heat boiler.

(3) *Combustion of carbonaceous deposit.*—When the pressure in reactor 17 reaches about 100 pounds gauge, valve 54 and the block valve in line 81 are opened and valve 79 and the block valve in line 80 are closed so that hot flue gas passes through the reactor through line 55 and line 56 to the waste heat boiler and the valve in by-pass line 83 is then closed. A sufficient excess of air is introduced into the flue gas heater through line 75 during the combustion step to provide the necessary oxygen for burning the carbonaceous material in reactor 17, but the amount of oxygen is regulated to prevent the temperature in the reactor from rising above 1150° F. at any point. By carefully controlling the rate of oxygen introduction and by recycling a large constant quantity of flue gas as above described I have found that the regeneration temperature in the reactor may be carefully controlled and at the same time the gases leaving the reactor contain no appreciable amounts of carbon monoxide. The very thorough combustion which is thus accomplished makes it unnecessary to provide for any supplemental oxidation of regeneration gases so that excess regeneration gases may be vented through line 67 directly to the atmosphere. Small amounts of oxygen may be present in the regeneration gases, particularly toward the end of this combustion step, but with normal operation at no time during the regeneration does the carbon monoxide content exceed about 0.1% or 0.2%. During this combustion step the recycled flue gases are introduced into the reactor at a temperature of about 525° F. to 850° F. and the gases leave the reactor at a temperature of about 1150° F. Total combustion requires about 4½ hours.

(d) *Reheating step.*—After most of the carbonaceous material has been burned from the catalyst the temperature of the flue gases leaving heater 71 is raised to about 1000° to 1150° F. in order to reheat the regenerated catalyst from its temperature of about 650° or 700° F. to a temperature of about 950° to 1000° F. During or immediately after this reheating step the combustion of the flue gas is regulated to provide a reducing atmosphere, i. e. combustion is effected with an insufficient amount of oxygen in order that any oxygen remaining in the catalyst in reactor 17 may be completely removed before the introduction of the recycled pressuring gas. The reheating may be started toward the end of the regeneration step so that the final part of the regeneration is effected at high temperature and instead of requiring the usual 40 minutes, the extra time required for reheating may be reduced to only a few minutes.

(e) *Depressuring step.*—At the completion of the combustion step the valve in line 81 and valve 54 are closed, the flue gas being by-passed by line 83 to the waste heat boiler and regulating valve 51 is gradually opened to once more reduce the pressure in the reactor to about atmospheric. This depressuring step usually requires only about 2 or 3 minutes.

(f) *Purging and repressuring with cycle gas.*—Regulating valve in line 82 is then opened in order that recycle gas may flow through the reactor at substantially atmospheric pressure for removing the regeneration gases therefrom. After passing about 3 to 4 reactor volumes of recycle gas through the reactor, valve 51 is closed, regulating valve in line 82 is opened still further and the pressure in the reactor is permitted to build up to the necessary reaction pressure, i. e. about 315 pounds per square inch. As soon as this pressure has been reached the valve in line 82 is closed, valve 18 is opened and the valve in line 19 is opened while valve 18' and the valve in line 19' are closed. Thus reactor 17 then goes on-stream for a period of about 6 hours while reactor 17' is purged, regenerated, reheated, purged and repressured, as hereinabove described.

Instead of using relatively cool recycle gas for the final purging and repressuring steps I may close or partially close valve 84 in line 26 and open or partially open the valve in line 85 so that hot hydrogen-containing gases may be passed through lines 82 and 82' at the desired high temperature.

As hereinabove indicated, I use separate transfer lines for the hot charging stock vapors and the hot recycle gas respectively. Transfer lines 15 and 16 join at a point near reactors 17 and 17'. These transfer lines are preferably of special chromium alloys. The use of a separate hot recycle gas transfer line reduces thermal conversion in transfer line 15.

By providing valved line 85 between transfer line 16 and repressuring gas line 26 I may accomplish many advantages. I avoid any cooling of the reheated catalyst immediately before it goes on-stream. I decrease the amount of reheating with flue gases and save in the time required for such reheating. Also line 85 makes it possible to continue the introduction into the reaction chamber of hot recycle gas containing hydrogen after the introduction of charge to that chamber has been stopped, thus permitting a preliminary stripping of the catalyst with hot recycle gas and the recovery of stripped products in separator 23 etc. The use of hot recycle gas from coil 14 and line 85 may in fact make it possible to avoid entirely the depressuring step after regeneration and even after the on-stream reaction.

Thus, for example, after the on-stream reaction in chamber 17 the introduction of charging stock from line 15 and hot recycle gas from line 16 is transferred to chamber 17', but hot recycle gas from line 85 may continue to pass through valve 82 and line 53 through chamber 17 to strip out all of remaining oil for recovery in separator 23 etc. After 5 to 15 minutes of such high temperature stripping, the chamber may simply be depressured to about 120 pounds per square inch, and hot oxygen-free flue gas may then be introduced through line 18 to complete the stripping before the regeneration step is initiated by introducing oxygen into the flue gas stream. When the regeneration is completed, the flue gas composition is again altered to provide a reducing atmosphere for the reheating step and immediately after substantially all oxygen has been thus removed, the flue gas flow is stopped and hot recycle gas is introduced through line 85 and valve 82 for effecting further oxygen elimination and reduction of the catalyst. The catalyst may then be repressured from 120 pounds to 315 pounds per square inch and be ready to go on-stream once more.

The system is so operated that flue gas compressor handles gases at about 650 to 700° F. This is accomplished by passing a sufficient amount of gases through valve 88 and line 89 to the gases leaving the waste heat boiler 59 through line 65 to maintain the desired temperature.

While I have described a preferred example of my invention, it should be understood that the invention is not limited to the details thereof. Where pressure is referred to in this specification, gauge pressure in pounds per square inch is indicated. The time required for the various steps and the temperatures, pressures and amounts of gas employed will, of course, vary considerably with different catalysts and with catalyst containing different amounts of carbonaceous materials.

I claim:

1. In a catalyst conversion system which is provided with a plurality of catalytic reactors which are alternately on stream and undergoing catalyst regeneration and which is provided with a flue gas heater for regulating the temperature and composition of flue gases, a waste heat boiler for absorbing heat from regeneration gases and a blower for recirculating regeneration gases to said flue gas heater, the method of continuously recycling flue gas from said flue gas heater through said waste heat boiler and for maintaining a substantially constant temperature of flue gases charged to said blower which method comprises passing flue gas from said heater through a reactor containing catalyst undergoing regeneration, passing a part of the gases from said reactor through said waste heat boiler, by-passing said waste heat boiler with another part of the gases from said reactor, admixing gas from said waste heat boiler with by-passed gas and passing the major portion of said gas to said blower, venting a minor portion of said gas from the system between said waste heat boiler and said blower, passing gases from said blower to said flue gas heater and regulating the proportion of gases passing from the reactor through the waste heat boiler and around the waste heat boiler respectively to maintain a substantially constant temperature of the gases charged to said blower.

2. A catalytic reforming process operated in the presence of hydrogen and at a temperature of about 850 to 1100° F. and a pressure of about 200 to 400 pounds per square inch in the presence of a dehydroaromatization catalyst which process comprises heating a low knock-rating naphtha to a temperature of about 950 to 1000° F., passing said heated charging stock through a transfer line to a reaction zone, separately heating a recycle gas containing hydrogen to a temperature of about 1050° F. to 1200° F., passing said heated recycle gas through a separate transfer line, mixing the hot charging stock from the first transfer line with the hot recycle gases from the second transfer line at a point near the reaction zone, contacting the mixed charging stock and recycle gas with said catalyst at a temperature of about 1050 to 900° F. at a space velocity of about ½ to 2 volumes of liquid charging stock per volume of catalyst space per hour, introducing about 2 to 4.5 mols of recycle gas per mol of charging stock, maintaining about 35% to 75% of hydrogen in said recycle gas, discontinuing the introduction of charging stock to said reaction zone while continuing the flow of recycle gas therethrough to effect stripping and recovery of hydrocarbons from said zone, passing the gases and vapors from the reaction zone through a heat exchange zone to a recycle gas separation zone, recovering a fraction of the gasoline boiling range from liquid products leaving the separation zone, venting a small part of the gases from said separation zone, and recycling a large part of the gases from the separation zone to said recycle gas heating step.

3. The method of treating a hydrocarbon charging stock of the naphtha boiling range which comprises heating and vaporizing said charging stock to obtain charging stock vapors at a temperature in the range of about 950° F. to 1100° F. and at a pressure in the range of about 200 to about 400 pounds per square inch, separately heating a gas stream containing at least about 35% of hydrogen to obtain a hot hydrogen containing gas at a temperature in the range of about 1050° F. to 1200° F. and at a pressure in the range of about 200 to about 400 pounds per square inch, introducing said hot charging stock vapors and said hot hydrogen containing gas into a reaction zone containing a catalyst consisting essentially of molybdenum oxide on alumina, passing said hot gases and vapors through said reaction zone while maintaining the temperature in said zone within the range of about 850° F. to 1100° F. and the space velocity in said zone within the range of ½ to 2 volumes of liquid charging stock per hour per volume of catalyst space in said zone, maintaining a hydrogen to charging stock ratio of about 1 to 3 mols of hydrogen per mol of charging stock, cooling the gases and vapors leaving the reaction zone to effect condensation of normally liquid hydrocarbons, separating a recycle gas stream containing at least about 35% of hydrogen from condensed liquids, heating at least a major portion of said gas stream to said temperature in the range of about 1050° F. to 1200° F. and utilizing said heated gas stream for purging the catalyst zone both before and after the reaction step as well as for controlling conversion during the reaction step.

4. In the conversion of hydrocarbon oil by contact with a catalytic mass at elevated temperature wherein the oil heated to a conversion temperature is passed through each of two contact masses alternately, one mass being onstream during passage of the oil therethrough, while the other mass is offstream undergoing regeneration to remove carbonaceous material deposited upon the catalyst during contact with the heated oil in onstream flow, the method of regenerating the offstream mass which comprises purging the offstream mass to remove retained hydrocarbons, thereafter passing a continuous stream of flue gas containing a small amount of free oxygen through the purged contact mass, the oxygen content and the volume of flow of the gas being such as to burn the carbonaceous material slowly and to remove the heat of combustion substantially entirely in the form of sensible heat of the gas issuing from the mass, removing sensible heat from the issuing gas, recycling cooled gas through the contact mass, continuing the passage of reacting gas through the mass until the carbon is substantially completely removed therefrom and the effluent gas stream contains some residual free oxygen, injecting in said stream of effluent gas containing free oxygen a small amount of hydrocarbons, passing said gas stream and injected hydrocarbons through a separate zone of combustion in the absence of said catalytic material whereby free oxygen is consumed by reaction with injected hydrocarbons, recycling the so treated effluent gas to the contact mass, continuing said recycling through the contact mass and separate combustion zone until the mass is purged of free oxygen and thereafter re-establishing the flow of heated hydrocarbon through the mass.

5. The method according to claim 4 in which the hydrocarbons injected into the effluent gas stream comprise hydrocarbon products of the cracking reaction boiling outside the range for gasoline.

ROBERT C. GUNNESS.